June 11, 1968  E. P. GUMPHREY ETAL  3,388,395

RADIATION SENSITIVE SYSTEM

Filed Jan. 31, 1967  4 Sheets-Sheet 3

United States Patent Office 3,388,395
Patented June 11, 1968

3,388,395
RADIATION SENSITIVE SYSTEM
Edward P. Gamphrey, Annapolis, and Murry J. Spangler, Ellicott City, Md., assignors to Westinghouse Electric Corporation, Pittsburgh, Pa., a corporation of Pennsylvania
Filed Jan. 31, 1967, Ser. No. 612,882
14 Claims. (Cl. 343—11)

ABSTRACT OF THE DISCLOSURE

This invention relates to a system for operating a radiation sensitive device such as a television camera tube to derive an output signal in a $\rho, \theta$ or PPI mode of operation. More specifically, a suitable waveform generator and AGC circuit are associated with the output signal of the television camera tube to compensate for variations in the output signal as a result of a variable angular velocity and for variations in the sweep repetition rate. This system has an important application in conjunction with radar systems where it is desired to superimpose the image of a map onto the display screen of the radar system.

---

This invention relates to radiation sensitive systems including a camera device and appropriate circuitry for deriving a signal which is modulated in accordance with the intensity of the radiation incident upon the camera device and derived upon the basis of a $\rho, \theta$ mode of operation.

In a typical radar system, the information derived from the rotating antenna is displayed upon a suitable PPI display device such as a cathode ray tube. More specifically, the radar system may include a transmitter for generating a series of pulses which are radiated by an antenna onto an object whose position is to be measured. An echo of the radiated signal is reflected back to the antenna which in turn applies the return or echo signal to a receiver. The receiver measures the transmission time between the radiated signal and the received signal to determine the relative distance of the target from the antenna and displays this information upon the cathode ray tube.

Typically, the antenna is rotated by a suitable servomotor to thereby detect targets within a defined area about the centrally orientated antenna. In order to display the information received from the antenna through the receiver, the cathode ray tube is operated to provide a $\rho, \theta$ or PPI scan (planned position indicator) of the target information. In order to indicate the range (or distance) of the target from the antenna a linear sweep must be used. In a $\rho, \theta$ or PPI mode of operation, the electron beam begins a scan at the approximate center of the screen and moves radially outward toward the periphery of the screen. Received echos or return signals from the target are applied to the cathode ray tube in such a way to produce intensity modulation of the electron beam scanning the cathode ray screen. An increase in intensity of the electron beam is produced whenever a target is detected thereby providing a bright spot upon the screen of the cathode ray tube. An indication of the range or distance of the target from the antenna is made by noting the distance of the bright spot of light from the center of the cathode ray tube screen. In other words, if a target appears at the center of the screen, its range is zero. If a target appears at the periphery of the screen, its range is the maximum range for which the radar system is adjusted.

Further, the sweep of the beam of electrons across the screen of the cathode ray tube indicates the position or bearing of a target. As the antenna rotates, the linear sweep of the beam of electrons must also rotate in synchronism with the antenna. More specifically, at the start of the transmitter pulse, the beam of electrons begins to move outwardly from the center towards the periphery of the screen. At the end of the first sweep, the beam moves rapidly back to the center of the screen thus completing the first sweep. At the start of the next transmitter pulse, a second sweep is made across the screen which is rotated by a predetermined angle. This process continues until the sweep of the electron beam has rotated about the surface of the screen. As stated above, the sweep of the beam of electrons across the screen and the antenna are synchronized so as to indicate the relative position of the targets upon the cathode ray tube. The amount of displacement of the sweeps depends upon the number of transmitted pulses per second and the speed of rotation of the antenna. By the time the antenna has completed one revolution, the entire screen has been covered with a series of narrowly separated, radial sweeps. In this manner, a radar system may be operated to provide information as to the distance of the object from the antenna and also the relative position or bearing of the position with regard to the radar system.

It is often desirable to superimpose the image of a map or other information onto the display screen of the cathode ray tube. In this manner, the location of objects which are not normally detected by the radar system may be displayed in relationship with the target which has been sensed by the above-described radar system. Typically, the location of such objects as national boundaries, landing fields, or other objectives could be clearly outlined simultaneously upon the display device of the radar system. In the prior art, this has been accomplished by writing or tracing with an appropriate pencil over the surface of the cathode ray tube to thereby superimpose various objects upon the display screen. However, this method of superimposing images upon the cathode ray tube has a serious limitation as a result of the parallax due to the viewer's position which may cause certain errors in determining the range and bearing of targets. Further, the use of a marking pencil prevents the adjustment of the range of the radar system without rendering the penciled images irrelevant with regard to the new display of information.

In order to overcome these disadvantages, it has been suggested to superimpose the image of a map or other trace onto the display screen of a PPI cathode ray tube electronically by viewing a prepared slide or transparency with a flying spot scanner and detecting the image with a photomultiplier which is applied through a suitable mixer to the PPI cathode ray tube. In one embodiment of the prior art, the flying spot scanner is operated to scan in a PPI mode and the photomultiplier provides a modulated signal whose intensity is dependent upon the information contained upon the transparency. In a second embodiment of the prior art, a cathode ray tube is operated to provide a linear scan and the slide or transparency is rotated by a suitable servomotor to obtain the desired PPI scan. The primary disadvantage of these prior art systems lies in the fact that the transparency or slide may not normally be prepared at the site of the radar system. Instead it is the typical practice of the prior art to prepare the slides (or transparencies) from maps by photographic processes which requires that slide preparation take place at a site remote from the radar system. It is often necessary to reduce the slide or transparency in order to be used with a flying spot scanner. Further, the use of a flying spot scanner and a photocell requires that the size of these systems (typically known as mappers) are quite large thereby making it difficult to transport these systems to remote areas.

It is therefore an object of this invention to provide a new and improved radiation sensitive system including a target member capable of storing a pattern of charges corresponding to a radiation image and deriving a signal from the storage element in a $\rho, \theta$ mode corresponding to the pattern of charges.

It is a still further object of this invention to provide a radiation sensitive system adapted to be used with a radar system incorporating a PPI display in which a suitable transparency or slide may be prepared quickly at the site of the radar system, and be inserted within the radiation sensitive system in order to accurately superimpose the image of the transparency upon the PPI display.

These and other objects are accomplished in accordance with teachings of this invention by providing a new and improved radiation sensitive system including a target member which is capable of storing a pattern of charges corresponding to a radiation image, means for generating and scanning a beam of electrons across the surface of the target member in a $\rho, \theta$ mode to thereby derive an output signal corresponding to the pattern of charges, and means associated with the target member for compensating for variations in the angular velocity and pulse repetition rate (PRF) of the sweep of the electron beam to insure that the output signal is directly proportional to the intensity of the radiation image.

Such a system as described above has a particular application in a radar system where it is desired to superimpose the outline of a map onto the image displayed by the PPI display of the radar system. Radar systems typically include a receiver for sensing the echo pulses from an antenna, a suitable PPI display such as a cathode ray tube which is scanned in a $\rho, \theta$ mode, an appropriate servomechanism for rotating the antenna, and appropriate sweep generators responsive to the rotation of the antenna to insure that the $\rho, \theta$ scan of the PPI display and the electron beam scanning of the target member are synchronized together with the rotation of the antenna.

It is noted that the target member as described above could be incorporated into a television camera tube such as an orthicon tube. It would normally be necessary to insert a lens to focus a radiation image onto the television camera tube, which lens would attenuate the peripheral portions more than the central portions of the radiation image. Therefore, in accordance with teachings of this invention, the output signal from the target member would also be modified to compensate for the attenuation of the output signal due to the insertion of the optical lens.

These and other objects and advantages of the present invention will become more apparent in view of the following descriptions and drawings, in which.

Figure 1:
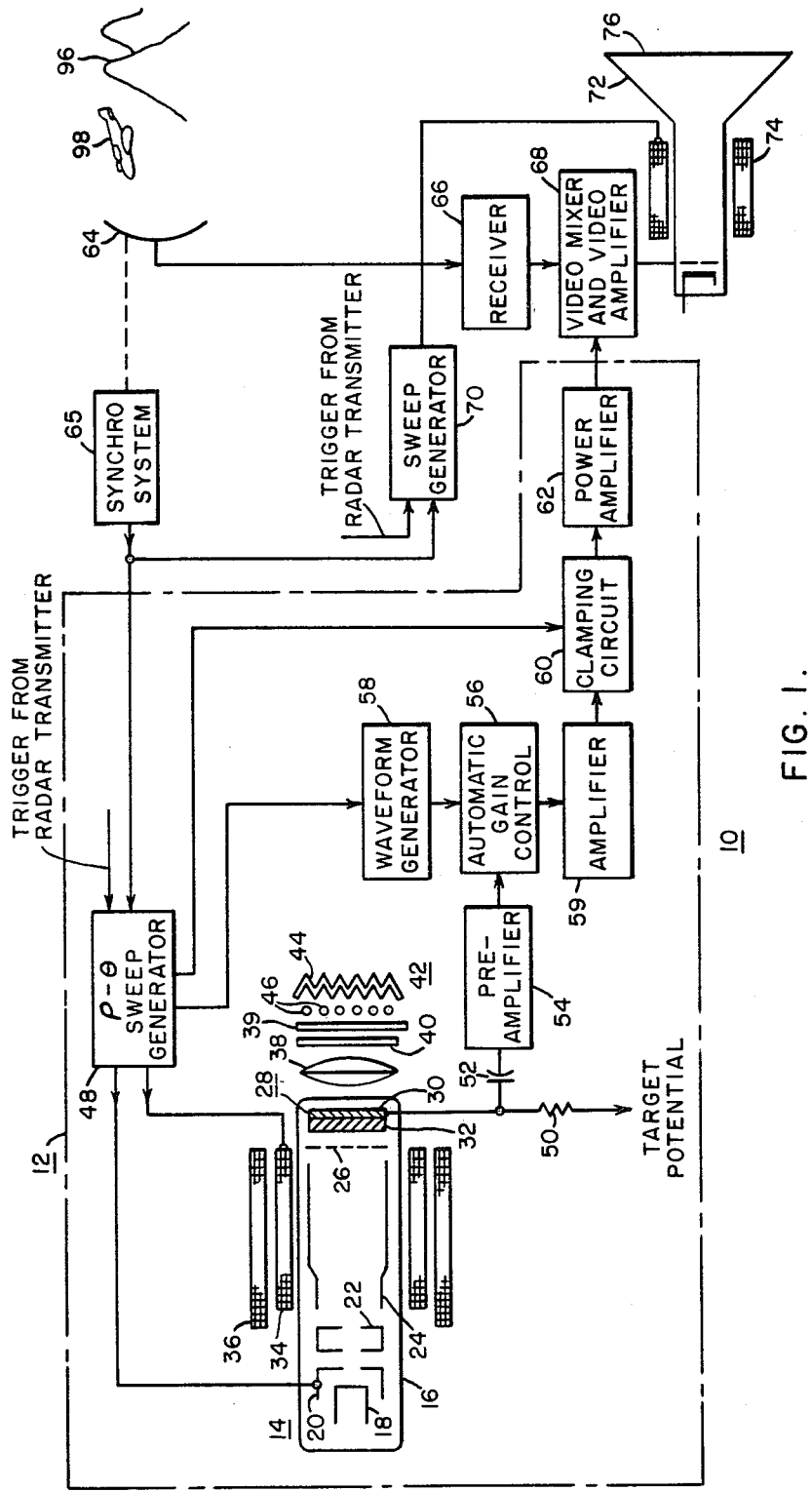
FIGURE 1 is a diagrammatic view of a radar system including a radiation system for deriving an output signal in a $\rho, \theta$ mode in accordance with the teachings of this invention.
Figure 6:
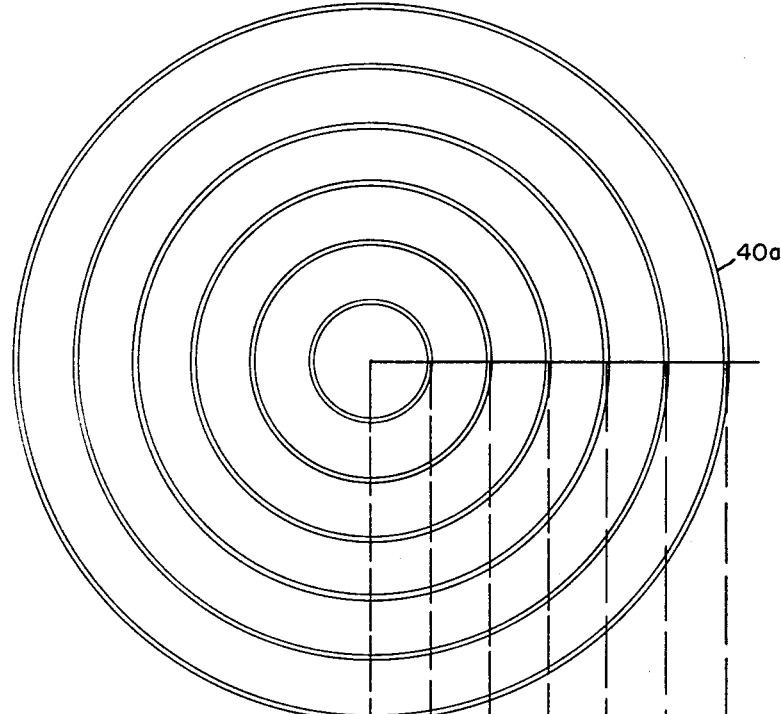

FIG. 6 is a graphical view of the effect of inserting a map into the radiation sensitive system of FIG. 1 upon the output signal derived from the preamplifier circuit of FIG. 1; and FIGS. 7A, 7B, 7C and 7D are graphs demonstrating the various properties of the target member as a function of $\rho$ and the necessary gain to be supplied to the output signal derived from the target member to compensate for variations in the angular velocity and the PRF of the sweep as well as variations in the focusing lens assembly.

Referring now to the drawings and in particular to FIG. 1, there is shown a radar system 10 incorporating a radiation sensitive system 12 for sensing the radiation image of a map 40 in accordance with the teachings of this invention. As described above, suitable high energy pulses are provided by a transmitter (not shown) to an antenna 64 to be radiated therefrom as the antenna 64 is rotated by an appropriate synchro system 65. The radiated pulses are radiated from the antenna 64 and strike surrounding objects such as the airplane 98 and the mountains 96. An echo of the transmitted signal is returned to the antenna 64 which directs the echo signal into a receiver 66 for processing. In turn, the receiver 66 provides an output signal corresponding to the range (i.e. the distance of the objects 96 and 98 from the antenna 64) to a video mixer and amplifier 68 for applying a video signal to a suitable display device such as a cathode ray tube 72. A beam of electrons is generated within the cathode ray tube 72 to be scanned across a fluorescent screen 76 by a set of deflection coils 74 in a $\rho, \theta$ or PPI scanning pattern. The deflection coils 74 are energized by a sweep generator 70 which provides suitable sweep voltages. The sweep generator 70 is synchronized with the rotation of the antenna 64 by the synchro system 65 so that the relative position or bearing of the objects viewed by the radar system may be appropriately displayed upon the cathode ray tube 72. As a result, the scan of the beam of electrons upon the screen 76 is in synchronism with the rotating antenna 64 so that when a return pulse is received by the antenna 64 a corresponding bright spot appears upon the fluorescent screen 76. Illustratively, the synchro system 65 may include an appropriate servo motor for rotating the antenna 64 and a closed loop feedback system including a control transformer for accurately controlling the speed of the servo motor. Typically, a suitable control transformer includes a rotor to which appropriate reference signals are applied, and suitable control stator windings from which output signals may be taken. Further, the rotor may be mechanically connected to the servo motor by a suitable gear train. As the rotor of the transformer is rotated by the servo motor, output signals are derived from the stator windings which are applied through an appropriate servo amplifier to provide a low impedance drive to the servo motor. Depending upon the phase of the output signal derived from the stator winding and the phase of the input signal to the rotor, the servo motor will turn either clockwise or counterclockwise. In addition, the synchro system 65 may include a position sensitive device such as a resolver or a synchro control transmitter having a shaft which is mechanically geared to the rotating antenna 64 and which provides an output signal indicating the position of the antenna 64. The output signals derived from the position sensing device are applied to a suitable system for detecting the information contained in the modulated waveform of these signals as a phase detector circuit. The output signals of the detecting circuits illustratively take the form of two slowly varying AC signals whose frequency depends upon the rotational velocity of the antenna 64 and whose relative phase indicates the position of the antenna 64. This signal indicating the angular position and speed of the antenna 64 is then fed into a $\rho, \theta$ sweep generator 48. In addition, the signal derived from the synchro system 65 is applied to the sweep generator 70 which provides suitable deflection current signals to be applied to the horizontal and vertical deflection coils 74 associated with the cathode ray tube 72. As explained above, this insures that the sweep of the electron across the screen 76 is synchronized with the rotation of the antenna 64.

It is an important object of this invention that the radiation sensitive system 12 is capable of superimposing an image upon the screen 76 of the cathode ray tube 72 corresponding to the information contained upon a slide or transparency which in one application of this invention may take the form of a map 40. The radiation sensitive system 12 further includes a radiation sensitive device 14 capable of providing output signals corresponding to the information contained upon the map 40 in a $\rho, \theta$ or PPI mode of operation. As will be explained in greater detail, the radiation sensitive system 12 includes appropriate circuitry for applying a compensated output video signal to the video mixer and video amplifier 68 so that a corresponding image of the slide 40 may also be superimposed with the information derived from the receiver 66 on the output screen 76 of the cathode ray tube 72.

The radiation sensitive device 14 in one particular embodiment of this invention may take the form of a suitable television camera tube such as a slow scan Vidicon tube type 7290 as manufactured by the assignee of this invention. Illustratively, the radiation sensitive device 14 includes an evacuated envelope 16 in which there is disposed at one end an electron gun including a cathode element 18 for providing a flow of electrons, a control grid 20 through which the electrons are directed, and accelerator and focusing electrodes 22 and 24 for directing the beam of electrons onto the surface of a target member 28. Illustratively, the target member 28 includes a layer 32 of a suitable dielectric storage material capable of storing a pattern of charges and having the property of being photoconductive to incident radiation. Further, a radiation transparent layer 30 of a suitable electrically conductive material is disposed upon one surface of the layer 32 to provide an electrode from which an output signal may be obtained. A mesh electrode 26 is disposed in a substantially parallel, spaced relation from the surface of the layer 32 in order to collimate the electrons emitted and focused by the electron gun onto the layer 32.

In order to deflect the electrons emitted from the cathode element 18 across the surface of the layer 32 in a $\rho, \theta$ scan pattern, a suitable deflection yoke or coil 34 is disposed about the radiation sensitive device 14. Typically, the quadrature wound yoke or coil 34 includes both horizontal and vertical deflection coils to which suitable sweep current signals are applied from the $\rho, \theta$ generator 48. The horizontal and vertical sweep signals are normally of a frequency corresponding to the PRF of the pulses transmitted from the antenna 64. As a result, the beam of electrons emitted from the cathode element 18 will be swept from the center to the periphery of the target member 28 at a rate substantially equal to the PRF. Further, the envelopes of the horizontal and vertical sweep signals are approximately 90° out of phase to effect a rotation of the scan of the electron beam by the deflection coils 34 at a rate substantially equal to the angular velocity of the antenna 64. In addition, focusing coils 36 are also disposed about the radiation sensitive device 14 for providing suitable magnetic fields for focusing the beam of electrons emitted by the cathode element 18 onto the surface of the layer 32.

As shown in FIG. 1, a suitable source of radiation 42 uniformly illuminates the map 40 to provide a radiation image which is focused by a suitable lens assembly 38 onto the target member 28. More specifically, the source of illumination 42 may include a serpentine shaped reflector 44, a plurality of lamps 46 which may illustratively be of the fluorescent type and a layer 39 of translucent material for diffusing the radiation from the lamps 46. Such a source 42 is particularly capable of establishing a uniform illumination across the entire surface of the transparency 40.

As explained above, the synchro system 65 applies to the $\rho, \theta$ sweep generator 48 input signals containing information as to the bearing and the angular velocity of the antenna 64. Illustratively, the sweep generator 48 includes two sweep generation generators, one for the vertical deflection coil and the other for the horizontal deflection coil. Each of the sweep generator circuits may include a gated clamp, an electronic switch, and an operational amplifier with a capacitance feedback for generating a linear sawtooth waveform the shape of which is proportional to the instantaneous amplitude of the input signal. A trigger signal is supplied from the radar transmitter to initiate and control the switch time of the generator and to provide as shown in FIG. 1 a blanking signal to the control grid 20 of the radiation sensitive device 14. Further, the $\rho, \theta$ sweep generator 48 provides a second sawtooth signal to a waveform generator 58 in order to provide compensation to the signal derived from the target member 28 as will be explained in detail later.

Briefly, the current signal derived from the target member 28 develops a voltage across a resistive element 50 which is applied through a capacitive element 52 to a preamplifier 54 which inverts (i.e. produces a phase change of 180°) to the video signal applied thereto. In order to provide the desired compensation to the output video signal, an automatic gain control circuit 56 controls the amplitude of the signal applied thereto in response to an input signal developed by the waveform generator 58. The automatic gain control circuit 56 compensates for variations in the PRF and angular velocity with which the beam of electrons is swept across the target member 28 so that the amplitude of the signal derived from the circuit 56 is proportional to the intensity of the radiation directed onto the target member 28. The level of the automatic gain control circuit output signal is raised by an amplifier 59 and is applied to a clamping circuit 60 to thereby reference the video signal to a DC level (or ground) in response to a signal derived from the $\rho, \theta$ sweep generator 48. The output signal derived from the clamping circuit 60 is then applied through a power amplifier 62 to the video mixer and video amplifier 68 to thereby electronically superimpose an image of the map 40 onto the screen 76 of the cathode ray tube 72.

Figure 4A:
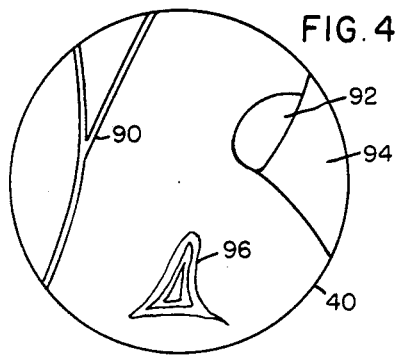
FIGS. 4A and 4B are respectively views of the map to be inserted in front of the radiation sensitive device of FIG. 1 and the resultant radiation image displayed upon the PPI display of FIG. 1 showing the map of FIG. 4A superimposed over the information received from the receiver of the radar system.
Figure 4B:
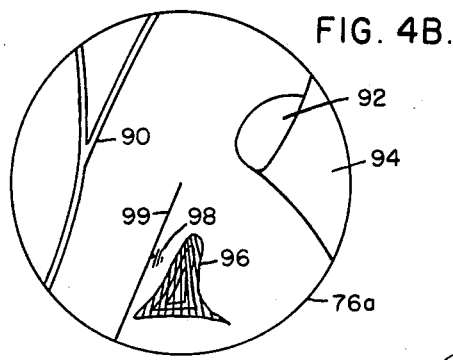

Referring now to FIGS. 4A and B, there is illustratively shown the indicia of the map 40, and also a super-imposed image 76a of the map 40 and the position data received from the radar receiver 66 as displayed upon the screen 76 of the cathode ray tube 72. With regard to FIG. 4A, there is shown the map 40 presenting information as to the position of a river 90, a mountain 96, a city 92, and a body of water 94. Typically, the lines corresponding to the various objects of the map 40 appear as opaque lines with the remaining portion of the map being substantially transparent to the radiation directed therethrough. The opaque lines of the map 40 are sensed by the target member 28 of the radiation sensitive device 14 and read off in a $\rho, \theta$ mode by the beam of electrons scanned across the surface of the target member 28. The video output signal from the target member 28 is processed as will be explained in greater detail later and applied through the video mixer and video amplifier 68 to the control element of the cathode ray tube 72. The image 76a provided by the screen 76 is composed of bright lines corresponding to the outlined objects 90, 92, 94, 96 and 98 of the map 40 displayed against a dark background. As the scan of the beam of electrons (indicated by a line 99) is rotated about the display screen 76, various objects such as the airplane 98 as detected by the antenna 64 will be displayed in the form of bright blips or dots. As shown in FIG. 1, the antenna 64 is, orientated to receive return or echo signals from an airplane 98 and a mountain 96. These objects will be displayed upon the screen 76 as shown in FIG. 4B so that the relative position of these objects with regard to the outlines of the map 40 may be accurately presented. This will enable an observer to determine the distance of the airplane 98 detected by the radar system from the city 92 or the river 90. It is noted that the position of the map 40 may be manually adjusted by the operator to insure a correct correlation between the bright spot representing the airplane 98 and the indicia of the map 40 by correlating the position of the mountain 96 as is observed by the radar system and the superimposed image of the mountain 96 from the radiation sensitive device 14. Further, such a radiation sensitive system 12 allows the superimposed image of the map 40 to be electronically adjusted, focused and/or enlarged to meet the requirements of the radar system 10.

In order to fully appreciate the contribution of this invention, the mode of operating and, in particular, the method of obtaining an output signal from the target member 28 by scanning a beam of electrons across the surface of the layer 32 will be explained more fully. First, the beam of electrons emitted from the cathode element 18 is scanned across the surface of the layer 32 by the deflection coils 34 in a $\rho, \theta$ scan pattern. A suitable potential below the first crossover of the material of which the layer 32 is made is applied through the resistive element 50 to the electrically conductive layer 30. The surface of the layer 32 is driven toward the potential of the cathode element 18 which is normally set at ground. As a result, a potential difference is established between the surface of the photoconductive layer 32 and the layer 30 of electrically conductive material. When a radiation image corresponding to the image of the map 40 is focused onto the target member 28, discrete portions of the photoconductive layer 32 tend to become conductive in proportion to the intensity of the radiation directed thereon. Thus, portions of the potential charge established upon the surface of the layer 32 are discharged or "leaked" through the more conductive portions of the photoconductive layer 32 to the electrically conductive layer 30. As the beam of electrons rescans the surface of the layer 32, the surface of the photoconductive layer 32 tends to recharge toward the potential of the cathode element 18 thereby drawing current proportional to the charge leaked through the layer 32 and the intensity of the radiation directed thereon. This recharging current establishes a potential across the resistive element 50 thereby providing a video output signal corresponding to the pattern of charges established upon the layer 32 and the radiation image incident upon the target member 28. Though a single type of readout has been illustratively described it is realized that the readout may also take the form of a return beam of electrons as is typically accomplished in an orthicon television camera tube.

Figure 5:
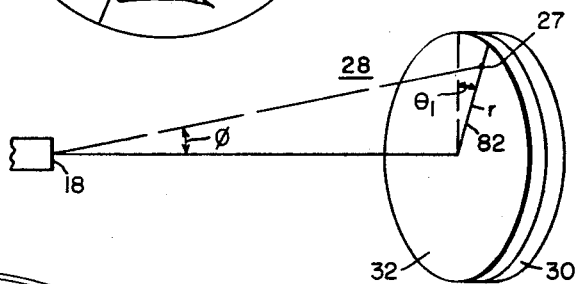
FIG. 5 is an orthogonal view of the target member shown in FIG. 1 demonstrating the $\rho, \theta$ or PPI mode of scanning the target member.

Referring now to FIG. 5, the point 27 of incidence of the beam of electrons emitted by the cathode element 18 at any instant of time is a function of the angular velocity $d\theta/dt$ and the radial velocity $d\phi/dt$, where $\theta$ is the annular measurement of rotation of the electron beam scan 82 from a fixed reference on the surface of the target member 28 and $\phi$ is the angular displacement of the point 27 from an axis defined by the cathode element 18 and the center of the target member 28. More specifically, the beam of electrons is scanned by the deflection coils 34 in a pattern beginning at the center of the target member 28 and proceeding radially towards the periphery of the target member 28. To complete the first scan, the beam of electrons is returned to the center of the target member 28 and a second scan of the beam of electrons begins with the beam of electrons being directed radially along a line or scan 82 which is offset by an angle $\theta_1$, with respect to the line of the first scan. This process continues so that the entire surface of the target member 28 is scanned by the beam of electrons.

In operating a target member 28 in a PPI or $\rho, \theta$ mode, a new set of problems are encountered which are not ordinarily met when operating in the normal, rectilinear scanning format associated with television transmission. The scanning of a beam of electrons in the typical vertical, horizontal raster provides a constant velocity of the sweep of the beam of electrons and a constant repetition rate between those times at which a single point is scanned by the beam of electrons. However, when operating in the $\rho, \theta_1$ mode, the electron density per unit area of the sweep of the electron beam across the surface of the target member 28 is not constant due to the variable radial velocity, the variable angular velocity and the variable sweep repetition rate.

As noted above, a particular portion of the target member 28 is discharged by the radiation directed thereon and a sweep of an electron beam having a particular density and energy is required to recharge the surface of the target member 28 to the potential of the cathode element 18. For a given intensity of radiation at any point upon the target member 28, a fixed amount of energy is required from the scanning beam of electrons to recharge the surface of the target member 28. However, as noted above, a beam of electrons scanned in a $\rho, \theta$ pattern does not meet these requirements.

The exposure of the target member 28 is measured in terms of the product of the intensity of the radiation directed on the target member 28 and the elapsed time between successive scans of the beam of electrons. The operation of the target member 28 is normally adjusted as to the angular velocity and the scan rate per unit of time (i.e. PRF—pulse repetition frequency) so that the periphery of the target member 28 is not saturated. The photoconductive layer 32 becomes saturated when the potential charge established on the surface of the layer 32 is almost completely discharged in response to intense radiation. When the operation of the target member 28 is adjusted to prevent saturation, the current output from the target member 28 for a single sweep of the electron beam at a given sweep rate is shown in curve A of FIG. 7A. It is noted that the output current derived from the target member 28 is proportional to the exposure of the target member 28 up to the point at which saturation occurs. If the PRF remains constant and the angular velocity of the scan is increased, the discharge current drawn from the electrically conductive layer 30 will decrease (see curve B of FIG. 7A) from center to edge since for a given period of time, less scans of the beam of electrons will be made at the edge and hence a smaller amount of the beam current will be required to recharge a unit area of the surface of the target member 28. It is apparent that the output current will be increased if the angular velocity is reduced or if the number of sweeps (PRF) of the beam of electrons is increased per revolution.

Figure 3A:
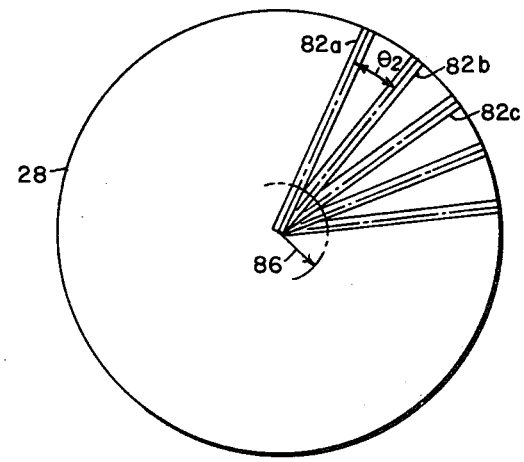
FIGS. 3A and 3B are diagrammatic views of the scanning of the target member shown in FIG. 1 for a low and a greater PRF respectively.
Figure 3B:
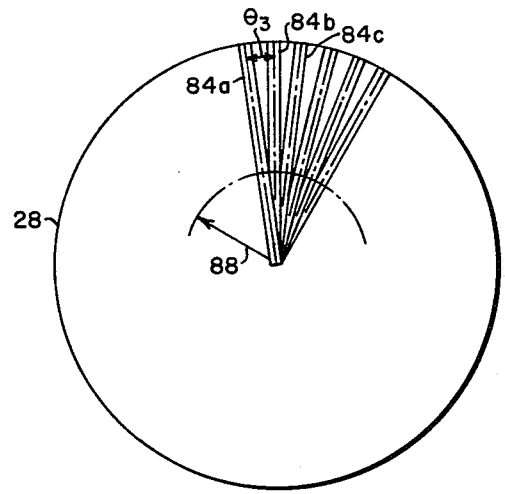

Referring now to FIGS. 3A and 3B, there is shown diagrammatically the locus of the electron beam as it is swept across the target member 28 in a PPI or $\rho, \theta$ scan pattern. More specifically, as shown in FIG. 3A, a first scan 82a begins at the center point of the target member 28 and proceeds radially toward the periphery of the target member 28. Upon reaching the periphery of the target member 28 the beam of electrons is rapidly brought back to the center and a second scan 82b is begun. It is particularly noted that the second scan takes place at a position rotated by an angle $\theta_2$ from the first scan 82a. At the end of the second scan 82b, a third scan 82c takes place whose position is likewise rotated from the second scan 82b by an angle $\theta_2$. This process will continue so that substantially the entire surface of the target member 28 will be scanned by the beam of electrons. Referring to FIG. 3B, a first scan 84a begins at the center of the target member 28 and proceeds radially toward the periphery of the target member 28. After the first scan 84a, the electron beam returns to the center of the target member 28 and proceeds along a second scan 84b displaced angularly by an angle $\theta_3$ from the first scan 84a. It is noted that the angle $\theta_3$ is smaller than the angle $\theta_2$.

Figure 7A:
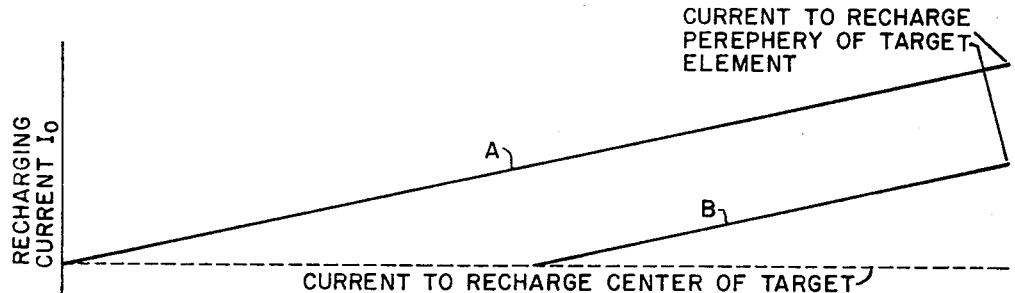
Figure 7B:
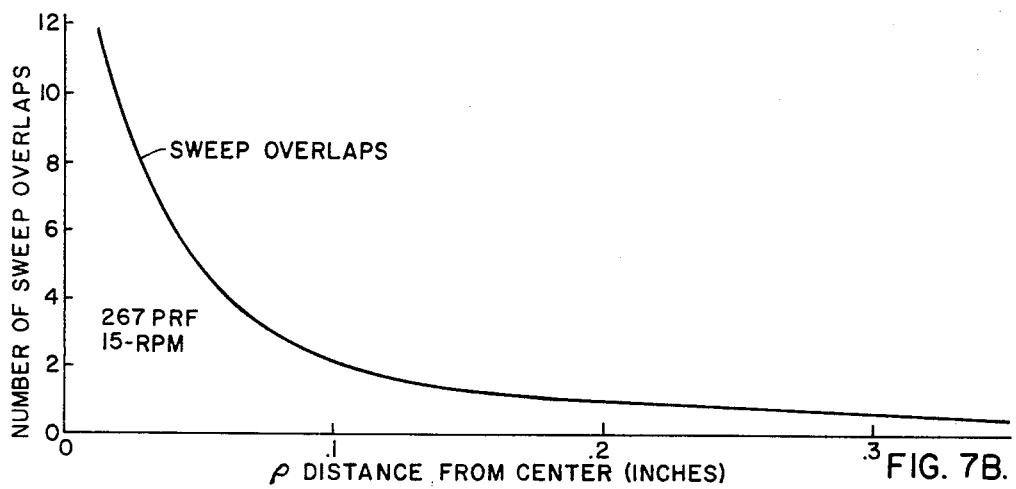

As shown in FIGS. 3A and B, the scans 82 and 84 of the beam of electrons do have a finite width, which for the purpose of demonstration has been exaggerated. More specifically, successive scans 82 of the beam of electrons do overlap with each other from the center of the target member 28 to a distance denoted by the numeral 86. In a similar manner, the scans 84 as shown in FIG. 3B overlap with each other to a distance denoted by the numeral 88. It is particularly pointed out that the overlap denoted by the numeral 88 exceeds the area of the overlap denoted by the numeral 86. It can be seen from FIGS. 3A and B that if the angular velocity of the sweep is decreased or if the PRF is increased that the angle of rotation between successive scans will be decreased and that the area of overlap will be increased. Further, for a given angular rotation of the scan, the number of overlaps of the successive scans of the electron beam decreases as a function of the distance from the center of the target member 28 as shown in FIG. 7B. Thus at the central portions of the target member 28, the number of overlaps of the electron beam upon a single point are the greatest. FIG. 7B was derived for the condition where the angular velocity of the scan was 15 r.p.m. and the PRF was 267 scans per sec. As a result, within those portions where there is overlap of successive scans of the electron beam, the exposure of the target member 28 is decreased thereby resulting in a decrease of the output current from the target member 28. As shown in FIGS. 3A and B, the exposure at the peripheries of the target member 28 occurs only once per revolution of the scan of the beam of electrons. On the other hand at the center of the target member 28, the elapsed time between the scans of electrons is the time between the successive scans of the beam of electrons. As a result, the exposure and the output current of these central portions of the target member 28, where the overlap of the scans of the electron beam occurs, is decreased. This effect is clearly shown in the curves of FIG. 7A. It is noted that the material of the layer 32 does have a tendency to charge laterally with the result that current from a point on the target member 28 will be reduced even though the successive scans of the overlapping electron beam do not fall precisely on a single point.

As explained above with regard to FIG. 1, the plurality of lamps 46 provide substantially even source of illumination upon the map 40. The map 40 consists of a transparent or translucent layer on which the information is placed as opaque lines. Sufficient radiation passes through the substantially transparent areas of the map 40 to drive the corresponding portions of the target member 28 to a near saturation condition. As explained above, the output current required to recharge the surface of layer 32 develops a potential across the resistant element 50 which is applied through the capacitive element 52 to the preamplifier 54, which in addition to supplying sufficient gain to the signal inverts the signal 180°. The readout current from the target member 28 is then adjusted for a maximum value for those portions of the radiation image of the greatest intensity corresponding to the transparent portions of the map 40. The output current signal from the target member 28 (for the relatively opaque areas of the map 40) may be thought of as a reduction from the saturation current occurring at intense radiations. The output signals from the preamplifier are then applied successively to the automatic gain control circuit 56, the amplifier 59, the clamping circuit 60, the power amplifier 62, the video mixer and video amplifier 68 to reproduce an image upon the cathode ray tube 72 where the dark images or lines of the map 40 appear as bright lines on the display of the cathode ray tube 72.

If a binary condition (i.e. the presence or absence of radiation) could be established upon the target member 28, the output signal would be independent of the PRF, or the angular velocity of the $\rho$, $\theta$ scan. However, this condition cannot be met for practical reasons and inevitably a certain amount of radiation from the dark areas of the map 40 will also illuminate the target member 28. The radiation corresponding to the dark or opaque areas of the map 40 produce a variation from the inverted video signal derived from the preamplifier 54 in which the amplitude of the signal corresponding to the dark areas varies as a function of the center to edge exposure, the rate of scan and the angular velocity of the $\rho$, $\theta$ scan. Referring now to FIG. 6, there is shown the effect of focusing an image from a map 40a having a plurality of equally spaced range rings onto the target member 28. It is noted that the range rings of the map 40a are opaque and would appear upon the screen 76 as bright lines against a dark background. The inverted output signal from the preamplifier 54 is shown graphically in FIG. 6 as a function of $\rho$ and it is apparent that the amplitude of the dark signal pulses decreases for increasing values of $\rho$ due primarily to the change of exposure or integration of the corresponding portions of the target member 28 as a result of the overlap of successive scans of the electron beam.

Figure 7C:
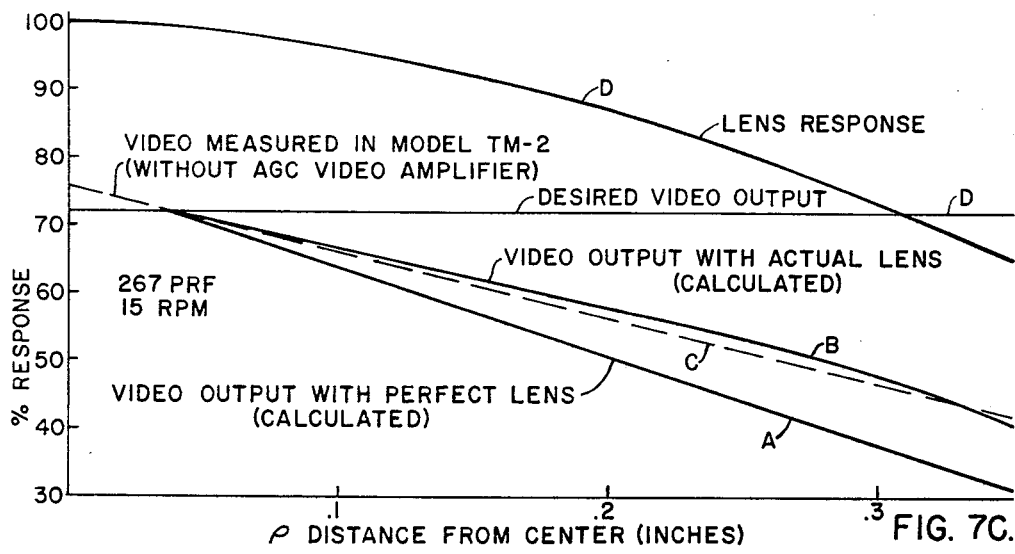

In addition to the variations of integration or exposure of the target member 28 due to the overlapping of the successive scans in a $\rho$, $\theta$ mode, the lens assembly 38 inserted between the map 40 and the target member 28 introduces certain radiation losses which are also a function of $\rho$. Referring to FIG. 7C, curve D shows the increasing attenuation of the transmission of the radiation image through the lens assembly as a function of $\rho$. Thus, the intensity of the radiation as it falls upon the target member and the discharge current 28 will be decreased as a function of the distance from the center of the target member 28. As shown in curve D of FIG. 7C, the maximum percentage of the radiation is transmitted through the center of the lens assembly 38 whereas at greater distances from the center, the radiation image is progressively attenuated.

As shown in FIG. 7C, curve A represents the output signal as derived from the preamplifier 54 in terms of percentage response as a function of $\rho$ for the condition where substantially uniform radiation is directed over the entire surface of the target member 28 or in other words, where a perfect lens would be incorporated into the radiation sensitive system 12. Curves B and C represent respectively the calculated and measured inverted, video signals in terms of relative response as derived from the preamplifier 54 as a function of $\rho$ where a suitable lens assembly 38 such as the $f$–2, Super Baltar lens is incorporated into the radiation sensitive system 12. In comparison, it is noted that the lens assembly 38 had the effect of reducing the intensity of the radiation at the peripheral portions of the target member 28, thereby reducing the saturated current and increasing the relative level or amplitude of the signal corresponding to the dark or opaque portion of the radiation image.

As also shown in curve D of FIG. 7, it is an important object of this invention to provide a radiation sensitive system whose output response when operating in a $\rho$, $\theta$ mode to be substantially constant as a function of the distance $\rho$ from the center of the target member 28. In order to accomplish this object, the variations of the output signal due to the overlapping of successive scans of the electron beam upon the surface of the target member 28 and the variations in transmission of the radiation image through the lens assembly 38 must be compensated for. In one particular embodiment of this invention, these variations may be compensated for by changing the relative amplitude of the output signal from the target element 28 on a line by line basis as a function of $\rho$. Specifically, this is accomplished through the use of the automatic gain control circuit 56 and the waveform generator 58. Generally, the automatic gain control circuit 56 varies the amplitude of the signal derived from the preamplifier circuit 54 as a function of an input signal derived from the waveform generator 58. As shown in FIG. 1, the waveform generator 58 receives an input signal from the $\rho$, $\theta$ sweep generator 48 to thereby apply an output signal to the automatic gain control circuit 56 in synchronism with the deflection signals applied to the deflection coils 34. As a result of the input signal applied to the automatic gain control circuit 56, the video signal derived from the preamplifier 54 is variously amplified. Referring now to FIG. 7D, there is shown one specific AGC function signal for controlling the varying gain of the AGC circuit 56 to compensate for the above enumerated variations. More specifically, it is noted that an increasing gain is provided to the output signal derived from the preamplifier 54 on a sweep by sweep basis as a function of the distance $\rho$ from the center of the target member 28.

Figure 2:
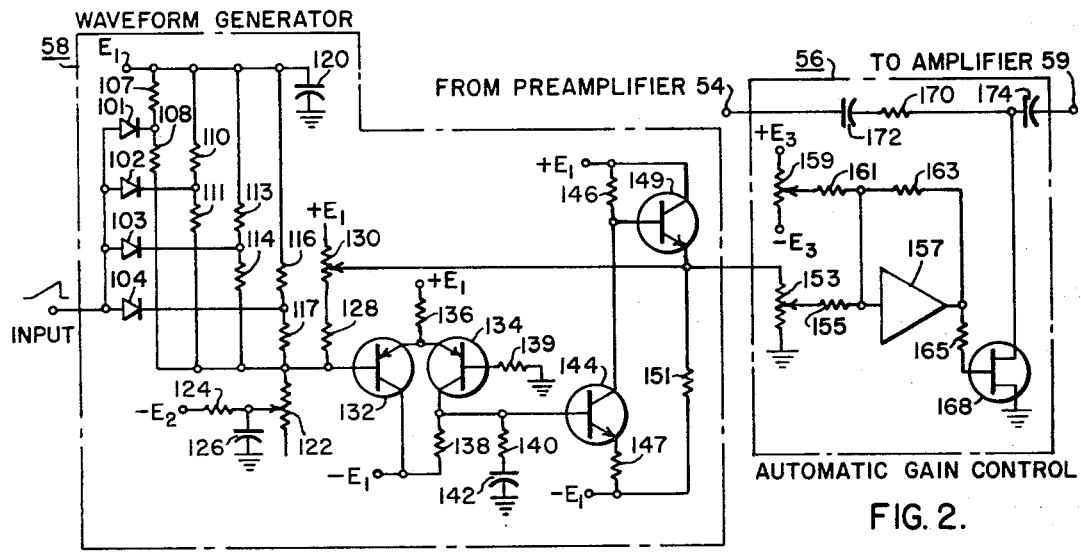
FIG. 2 is a schematic diagram of an automatic gain control amplifier and a waveform generator for providing the necessary compensation to the output signal derived from the radiation sensitive device of FIG. 1.
Figure 7D:

Referring now to FIG. 2, there is shown particular, illustrative embodiments of the circuits that make up the waveform generator 58 and the automatic gain control circuit 56. The output signal as derived from the preamplifier 54 (similar to that shown in FIG. 6) is applied through a capacitive element 172 to a resistive element 170. The resistive element 170 acts as a voltage divider in conjunction with an FET transistor 168 which is connected to ground. As is well known in the art, the impedance of an FET transistor 168 is dependent upon the input signal applied to the gate thereof. In this particular illustrative circuit 56, the input is derived from the wave generator 58 and applied to a variable resistive element 153. The variable tap of the resistive element 153 is applied through a resistive element 155 to an operational or summing amplifier 157. In one specific, illustrative embodiment, the operational amplifier 157 could be of the type $\mu$A709 as manufactured by the Fairchild Corporation. The operational amplifier 157 functions to shift the DC level of the input signal to an appropriate level to be applied to the gate of the FET transistor 168. More specifically, the output of the operational amplifier 157 is applied through a resistive element 165 to the gate of the FET transistor 168. Further, the gain of the operational amplifier 157 may be controlled by a parallel connected resistive element 163. Further, the DC level at which the input signal is applied to the operational amplifier 157 is controlled by a voltage dividing network including a variable resistive element 159 interconnected between a $+E_3$ and a $-E_3$ potential. A variable tap is taken from the resistive element 159 through a resistive element 161 and applied to the input of the operational amplifier 157. By determining the precise point at which the tap of the resistive element 159 is set, the DC input potential and thus the DC output potential of the operational amplifier 157 may be determined. Briefly in operation, the AGC function signal as shown in FIG. 7D may be applied through the resistive elements 153 and 155 to be amplified by the operational amplifier 157 to a suitable level to be applied through the resistive element 165 to the FET transistor 168. The input signal applied to the gate of the FET transistor 168 determines the impedance of the FET transistor 168. The FET transistor 168 forms in conjunction with resistive element 170, a voltage dividing network so that the output signal applied to the amplifier 59 is a function of the input potential applied to the gate of the FET transistor 168 and therefore the gain function shown in FIG. 7D.

The AGC function signal as shown in FIG. 7D is in one particular, illustrative embodiment of this invention developed by the waveform generator 58 as shown in FIG. 2. Typically, a sawtooth voltage made up of a series of linear ramps is applied to the input of the waveform generator 58 from the $\rho$, $\theta$ generator 48. In one particular illustrative embodiment of the waveform generator 58, the input, linear ramp is applied to the anode of diodes 101 to 104 which are tied together to the input. Further the cathode of the diode 101 is connected to the common point between resistive elements 107 and 108. Similarly, the cathode of diode 102 is connected to the common point of the resistive elements 110 and 111; the cathode of the diode 103 is connected to the common point between the resistive elements 113 and 114; and the cathode of the diode 104 is connected to the common point between the resistive elements 116 and 117. As shown in FIG. 2, the top terminals of the resistive elements 107, 110, 113 and 116 are connected together to a potential $E_1$. Further, a suitable capacitive element 120 is also connected to the potential $E_1$, in order to decouple to ground any stray signals. The other terminals of the resistive elements 108, 111, 114 and 117 are tied together at a common point and a suitable potential $E_2$ is applied to this common point through a resistive element 124 and a variable resistive element 122. More specifically, a tap is brought from the resistive element 122 and applied through the resistive element 124 to the potential $E_2$. Further, the common point between the tap of the resistive element 122 and the resistive element 124 is applied through a capacitive element 126 to ground in order to decouple to ground any stray signals associated with the potential $E_2$. The common point to which the resistive elements 108, 111, 114 and 117 are tied is coupled to a differential amplifier formed by transistors 132 and 134. More specifically, this common point is applied to the base of the transistor 132 whose collector is connected to a $-E_1$ potential and whose emitter is tied to the emitter of the transistor 134. A resistive element 136 is interconnected between the emitters of the transistors 132 and 134 and a potential $+E_1$. The collector of the transistor 134 is connected through a resistive element 138 to the base of the transistor 132, at which point is applied the potential $-E_1$. Further, the base of the transistor 134 is connected through a resistive element 139 to ground. In the absence of an input signal, the potentials applied to the bases of the transistors 132 and 134 are normally set to be equal. The current passing through the transistor 134 develops a potential across the resistive element 138 which is applied to the base of a transistor 144. In order to stabilize the circuit operation, a resistive element 140 and a capacitive element 142 are serially connected between ground and the common point between the resistive element 138 and the base of the transistor 144. The transistor 144 and a second transistor 149 form an amplifier and emitter follower combination having an impedance matched to the differential amplifier formed by the transistors 132 and 134, for providing power amplification to the output signal derived from the differential amplifier. More specifically, the collector of the transistor 144 is connected in series through a resistive element 146 to a potential $E_1$. The emitter of the transistor 144 is connected through a resistive element 147 to a potential $-E_1$. Further, the base of the transistor 149 is connected to the common point between the collector of the transistor 144 and the resistive element 146. The emitter of the transistor 149 is connected through a resistive element 151 to the potential $-E_1$ and the collector of the transistor 149 is connected to the potential $+E_1$. A suitable feedback loop is provided from the emitter of the transistor 149 through a variable resistive element 130 and a resistive element 128 to the base of the transistor 132. The tap of the resistive element 130 may be adjusted to provide more or less impedance in the feedback circuit to thereby control the gain of the differential and emitter follower amplifier combination.

Briefly, in operation, the linear input ramp is applied to each of the diodes 101 to 104 which are biased by the potentials $E_1$ and $E_2$ to conduct at increasingly greater voltages. When the potential of the input ramp is sufficiently high to cause the diode 101 to be conductive, a portion of the input ramp will be applied across the resistive element 108 to the base of the transistor 132. The closed loop gain of the amplifier and the emitter follower combination and hence the amplitude of the signal at the junction of the resistive elements 151 and 153 will be determined by resistive elements 108, 128 and 130. As the potential of the input ramp continues to rise, the diode 102 will begin to conduct when the potential becomes sufficiently high. The closed loop gain of the amplifier and the emitter follower combination and hence the signal amplitude at the junction of the resistive elements 151 and 153 becomes a function of the resistive element 108 connected in parallel with the resistive element 111 and the resistive elements 128 and 130. Since the loop gain has now changed, the scope of the output signal changes. In a similar manner, the diodes 103 and 104 will be successively rendered conductive and the slope of the ramp at the junction of the resistive elements 151 and 153 will be altered by the effects of the resistive elements 114 and 117. As a result, a waveform or function signal will be provided with five linear portions having slopes as determined by the increasing number of resistive elements connected in parallel and presented to the input signal. The waveform developed within the diode matrix is applied to the differential amplifier thereby upsetting the current balance through the transistors 132 and 134 to thereby develop an inverted signal across the resistive element 138. More specifically, increasing the potential applied to the base of the transistor 132 draws an increasing amount of current through the transistor 132. As a result, the current drawn through the transistor 134 is proportionally decreased resulting in an inverted signal or a signal 180° out of phase with the input signal. The inverted signal is applied to the base of the transistor 144 where suitable amplification is provided by the transistors 144 and 149 which make up the emitter follower and amplifier combination. In summary, the diode matrix forms a waveform having a plurality of linear portions whose slope decreases as successive diodes are made conductive. This waveform is applied to the differential amplifier which in effect inverts the signal applied thereto and provides a signal with an increasing slope and form similar to the curve shown in FIG. 7D. Appropriate amplification is provided by the amplifier and emitter follower combination which supplies the properly shaped waveform to the input of the AGC circuit 56.

The gain of the differential amplifier, and the amplifier and emitter follower combination of the waveform generator 58 is controlled by the impedance inserted in the feedback loop formed by the variable resistive elements 130 and 128. It is desirable to adjust the amount of resistance provided by the variable resistive element 130 in this feedback loop in order to compensate for variations in the pulse rate frequency (PRF) with which the target member 28 is scanned by the beam of electrons. As the PRF is increased, the overlap between successive scans of the beam of electrons across the surface of the target member 28 likewise increases. Thus, the exposure (or integration of the radiation) of the peripheral portions of the target member 28 and the output current are decreased. As a result, the output signal provided from the target member 28 through the preamplifier 54 will require greater gain. For this condition, compensation can be provided by increasing the amount of impedance provided in the feedback loop circuit of the waveform generator 58 by adjusting the tap of the resistive impedance 130 to insert a greater resistance. As a result, the gain of the differential amplifier and amplifier and emitter follower combination of the waveform generator 58 will be increased and the amplitude of gain waveform applied to the AGC circuit 56 will be increased to thereby provide a greater gain and therefore amplification to the video signal received from the preamplifier 54. Referring to FIG. 7C, an increase in the PRF above 267 scans per second will progressively decrease for greater values of p the amplitude of the video signal taken at the preamplifier 54 with respect to the amplitude of the curve C. Conversely, if the target member 28 is scanned at a slower PRF, the uncompensated video output signal will have a progressively greater amplitude than curve C. It is noted that the curve C shown in FIG. 7C was derived for the particular case in which the PRF was set for 267 scans per second and the angular velocity was set for 15 revolutions per minute with an illumination of approximately 70-foot candles.

Further, variations in the angular velocity of the scan of the beam of electrons provide a second order variation of the target exposure and thus the video output signal. Thus, if the PRF is maintained substantially constant, an increase in the angular velocity of the sweep corresponding to a greater antenna speed caused less overlap between successive scans of the beam of electrons with the result that the current required to charge the target member 28 does increase slightly. Thus, for greater angular velocities, it is necessary to effect an increased gain of the AGC circuit 56 by increasing the amplitude of the AGC waveform applied thereto. This is accomplished through the use of the variable resistive element 122 which may be adjusted to lower or raise the potentials at which the diodes 101 to 104 are made conductive. Thus, when it is desired to increase the value of the AGC waveform, the resistance presented by the variable resistive element 122 is decreased thereby raising the voltage points at which the diodes are made conductive. Conversely, if the angular velocity of the sweep is decreased, it is desired to decrease the waveform or function signal applied to the AGC circuit 56, and the variable resistive element 122 is adjusted to provide a greater resistance. It is noted that variations in the angular velocity are considered to be a second order effect and do not require the same magnitude of adjustment as does changes in the PRF to compensate the video signal.

In one particular embodiment, the elements of the circuits 56 and 58 may be of the following type or value:

*Waveform generator—58*

| Element: | Type or value |
|---|---|
| Diode— | |
| 101 | 1N914 |
| 102 | 1N914 |
| 103 | 1N914 |
| 104 | 1N914 |
| Resistive element— | |
| 107 | 17.8K |
| 108 | 1.2K |
| 110 | 16K |
| 111 | 3.15K |
| 113 | 14K |
| 114 | 5.6K |
| 116 | 13K |
| 117 | 6.8K |
| Capacitive element— | |
| 120 | 15 μf. |
| Resistive element— | |
| 122 | 10K |
| 124 | 14.7K |
| Capacitive element— | |
| 126 | 11 μf. |
| Resistive element— | |
| 128 | 1K |
| 130 | 10K |
| 136 | 2.15K |
| Transistor— | |
| 132 | MD982 |
| 134 | MD982 |
| Resistive element— | |
| 138 | 2.15K |
| Capacitive element— | |
| 142 | 100 pf. |
| Resistive element— | |
| 139 | 100Ω |
| 140 | 510Ω |
| Transistor— | |
| 144 | 2N708 |
| 149 | 2N708 |
| Resistive element— | |
| 147 | 1K |
| 146 | 2.15K |
| 151 | 2.7K |

AGC amplifier—56

| Element: | Type or value |
|---|---|
| Resistive element— | |
| 153 | 10K |
| 155 | 10K |
| 159 | 5K |
| 161 | 20K |
| 165 | 10K |
| 163 | 10K |
| 170 | 4.7K |
| FET transistor— | |
| 168 | 2N3436 |
| Capacitive element— | |
| 172 | 100 µf. |
| 174 | 100 µf. |

In summary, it is an important object of this invention to prevent simultaneously upon a suitable display such as a cathode ray tube bearing and range data as derived from a radar system and an image of transparency such as a map. In order to superimpose the image of the map 40 onto the screen 76 of the cathode ray tube 72, the radiation image of the map 40 is sensed by the radiation sensitive device 14. More specifically, a pattern of charges corresponding to the radiation image of the map 40 is deposited upon the target member 28 and is read off by a beam of electrons which is swept by the deflection coils 34 across the surface of the target member 28. The sweep generator 48 provides suitable sweep signals to the deflection coils 34 of the radiation sensitive device 14 and to the deflection coils 74 of the cathode ray tube 72 in synchronism with the rotating antenna 64. As a result, the video signal derived from the target member 28 may be displayed in synchronism with the radar data upon the screen 76 of the cathode ray tube 72. In accordance with one prime aspect of this invention, the variations in the output signal derived from the target member 28 due to varying integration times as a result of the successive overlap of the beams of electrons may be compensated for on a line by line basis in order that a video output signal may be derived which is proportional to the intensity of the radiation image directed onto the target member 28. In one particular embodiment of this invention, the automatic gain control circuit 56 and the waveform generator 58 provide appropriate compensation in the output signal derived from the target member 28. The compensated signal is then appropriately amplified, and mixed with the data received from the receiver 66 to provide a superimposed image (as shown in FIG. 4B) upon the screen 76 of the cathode ray tube 72.

Numerous changes may be made in the above described apparatus and different embodiments of the invention may be made such as incorporating a radiation sensitive device other than a Vidicon television camera tube.

In one alternative embodiment, a suitable radiation sensitive television camera tube could be used to sense the radiation image with an output signal derived therefrom in a typical vertical, horizontal television raster to be written upon a target member as a pattern of charge in an electrical-in electrical-out storage tube. In accordance with the teachings of this invention, the output signal would be derived from the target member of the storage tube by scanning the target member thereof in a $\rho, \theta$ or PPI mode. The erasure of the pattern of charges disposed upon the target member is also a function of the density of the reading electron beam per unit of time. The central portions of the target member where the overlapping of the scans of the electron beam occurs tend to erase at a faster rate. As a result, the central portions provide less current output signal than the peripheral portions of the target member. Since there is a gradual erasure of the pattern of charges on the target member by the readout electron beam, it is necessary to compensate the output video signal in a manner similar to that method described above. It is recognized that the shape of the compensation waveform would differ from the curve of FIG. 7D. More specifically, less gain would be required for increasing values of $\rho$. Therefore, it is intended that all matter contained in the foregoing description or shown in the accompanying drawings shall be interpreted as illustrative and not in a limiting sense.

We claim as our invention:

1. A system for providing a video output signal corresponding to a radiation image comprising a target member capable of storing a pattern of charges corresponding to said radiation image and providing a first signal in response to a beam of electrons; first means for scanning said beam of electrons upon said target member in a pattern so that the time interval between the successive scans of said electron beam upon a first portion of said target member is greater than the time interval between the successive scans of said electron beam upon a second portion of said target member; and second means to which said first signal is applied for modifying said first signal as a function of said time interval to provide a second signal which corresponds to the intensity of said radiation image.

2. A radiation sensitive system for detecting a radiation image comprising a target member capable of storing a pattern of charges corresponding to said radiation image and providing a first output signal in response to an incident beam of electrons, first means for scanning said beam of electrons in a $\rho, \theta$ mode across the surface of said target member, and second means to which said first output signal is applied for modifying said first output signal for increasing values of $\rho$ as a function of the interval of time between successive scans of said beam of electrons to provide a second output signal that corresponds to the intensity of said radiation image.

3. The radiation sensitive system as claimed in claim 2, wherein said second means for modifying adjusts the amplitude of said first output signal for increasing values of $\rho$ of the scan as a function of the number of scans of said beam of electrons per unit of time.

4. The radiation sensitive system as claimed in claim 2, wherein said second means for modifying adjusts the amplitude of said first output signal for increasing values of $\rho$ of said scan as a function of the angular velocity of the scanning of said beam of electrons.

5. A radiation sensitive system as claimed in claim 2, wherein said second means for modifying adjusts the amplitude of said first output signal for varying values of $\rho$ of the scan as a function of the number of scans of said beam of electrons per unit of time and of the angular velocity of the scanning of said beam of electrons.

6. The radiation sensitive system as claimed in claim 2, wherein said second means for modifying adjusts the amplitude of said first output signal for increasing values of $\rho$ of the scan as a function of the degree of overlap of successive scans of said beam of electrons.

7. The radiation sensitive system as claimed in claim 2, wherein said second means adjusts the amplitude of said first output signal as a function of $\rho$ on a sweep by sweep basis.

8. A radiation sensitive system as claimed in claim 2, wherein said second means includes a first circuit for providing a third output signal whose amplitude is as a function of the degree of overlap of the successive scans of said beam of electron for varying values of $\rho$, and a second circuit for amplifying said first output signal derived from said target member with a gain dependent upon said third output signal of said first circuit.

9. A radiation sensitive system as claimed in claim 8, wherein said first means for scanning said beam of electron includes a sweep generator and deflection coils energized by said sweep generator, said first circuit responsive to said sweep generator to provide said third output signal in synchronism with the scanning of said beam of electrons by said first means.

10. A radiation sensitive system as claimed in claim 2, wherein there is included third means for providing a third output signal, fourth means for providing a visual display, and fifth means for synchronizing the application of said second output signal and said third output signal of third means upon said fourth means.

11. A radar system including a radiation sensitive system as claimed in claim 2, wherein there is included an antenna for transmitting and receiving radar signals, a receiver associated with said antenna for providing a third output signal, display means associated with said receiver for indicating the bearing and range of the objects sensed by said antenna, means for rotating said antenna, and means sensitive to the position of said antenna for synchronizing the scanning of said electron beam across said target member and the display of said second and third output signals upon said display means with the rotation of said antenna.

12. A radar system including the radiation sensitive system as claimed in claim 2, including an antenna for transmitting and receiving radar signals, a receiver associated with said antenna for providing a third output signal indicative of the bearing and range of the objects sensed by said antenna, a cathode ray tube including deflection coils for providing a visual display, a synchro system for rotating said antenna and providing a fourth output signal indicative of the position of said antenna, a sweep generator responsive to said synchro system for providing sweep deflection signals in synchronism with the rotation of said antenna and the transmission of said radar signals, said first means of said radiation sensitive system including deflection coils for scanning said beam of electrons across said target member, said deflection coils of said first means associated with said sweep generator to sweep said electron beam in synchronism with the position of said antenna, said deflection coils of said cathode ray tube responsive to said deflection signals of said sweep generator so that the information displayed upon said cathode ray tube is in synchronism with the rotation of said antenna.

13. A radar system as claimed in claim 12, wherein said second means includes a waveform generator responsive to said sweep generator to prove a gain function signal in synchronism with said deflection signals, and an automatic gain control circuit associated with said target member to amplify said first output signal by a factor dependent upon said gain function signal in order that said second output signal will be proportional to the intensity of said radiation image.

14. A radiation sensitive system as claimed in claim 2, further including lens means for focusing said radiation image, said second means modifying said first output signal as a function of the attenuation of said radiation image by said lens means.

References Cited

UNITED STATES PATENTS

| | | | |
|---|---|---|---|
| 3,113,311 | 12/1963 | Searle et al. | 343—11 X |
| 3,231,887 | 1/1966 | Cross et al. | 343—5 X |
| 3,290,674 | 12/1966 | Calhoon | 343—5 |

RODNEY D. BENNETT, *Primary Examiner.*

M. F. HUBLER, *Assistant Examiner.*